(12) United States Patent
Ko et al.

(10) Patent No.: US 8,582,026 B2
(45) Date of Patent: Nov. 12, 2013

(54) MOBILE TERMINAL

(75) Inventors: Dongseuck Ko, Gyeonggi-Do (KR);
Jeunguk Ha, Seoul (KR); Namsoo Kim,
Gyeonggi-Do (KR); Jongin Im, Seoul
(KR); Hyunsuk Yang, Gyeonggi-Do
(KR); Mansoo Sin, Seoul (KR);
Jeeyoung Cheon, Seoul (KR);
Jinwoong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 13/188,151

(22) Filed: Jul. 21, 2011

(65) Prior Publication Data

US 2013/0016267 A1 Jan. 17, 2013

(30) Foreign Application Priority Data

Jul. 12, 2011 (KR) .......................... 10-2011-0068745

(51) Int. Cl.
*H04N 5/225* (2006.01)
(52) U.S. Cl.
USPC .............................. 348/374; 345/205; 349/58
(58) Field of Classification Search
USPC .................................................. 348/373–376
See application file for complete search history.

(56) References Cited

U.S. PATENT DOCUMENTS

| | | | |
|---|---|---|---|
| 6,255,705 B1 | 7/2001 | Zhang et al. | |
| 6,836,669 B2 * | 12/2004 | Miyake et al. | 455/556.1 |
| 7,495,702 B2 * | 2/2009 | Herranen et al. | 348/373 |
| 7,646,426 B2 * | 1/2010 | Saiki et al. | 348/373 |
| 7,847,879 B2 * | 12/2010 | Choi | 349/58 |
| 2004/0212555 A1 * | 10/2004 | Falco | 345/50 |
| 2006/0140617 A1 * | 6/2006 | Xu et al. | 396/268 |
| 2006/0279652 A1 * | 12/2006 | Yang et al. | 348/333.01 |
| 2007/0019127 A1 * | 1/2007 | Oohira | 349/58 |
| 2007/0035473 A1 * | 2/2007 | Yamazaki et al. | 345/4 |
| 2007/0249084 A1 | 10/2007 | Zhang et al. | |
| 2008/0068484 A1 * | 3/2008 | Nam | 348/333.01 |
| 2008/0158496 A1 * | 7/2008 | Kim et al. | 349/151 |
| 2008/0211754 A1 * | 9/2008 | Park et al. | 345/87 |
| 2008/0309842 A1 * | 12/2008 | Kim | 349/58 |
| 2010/0048249 A1 * | 2/2010 | Furuta et al. | 455/566 |

FOREIGN PATENT DOCUMENTS

JP 11-088803 A 3/1999

* cited by examiner

*Primary Examiner* — James M Hannett
*Assistant Examiner* — Wesley J Chiu
(74) *Attorney, Agent, or Firm* — Birch, Stewart, Kolasch & Birch, LLP

(57) ABSTRACT

The present invention provides a mobile terminal including a terminal body having a camera, and a liquid crystal panel partitioned into a screen display region disposed with liquid crystal to display a screen, and a control region disposed with a drive circuit for driving the liquid crystal, wherein the liquid crystal panel is formed such that at least part of the control region is removed, and the camera is disposed adjacent to a removal portion formed by the removal.

16 Claims, 10 Drawing Sheets

MOBILE TERMINAL

RELATED APPLICATION

Pursuant to 35 U.S.C. §119(a), this application claims the benefit of earlier filing date and right of priority to Korean Application No. 10-2011-0068745, filed on Jul. 12, 2011, the contents of which is incorporated by reference herein in its entirety.

BACKGROUND OF THE INVENTION

1. Field of the Invention

The present disclosure relates to a mobile terminal having a display unit occupying most of the front surface thereof.

2. Description of the Related Art

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player.

For the functional support and enhancement of such a mobile terminal, it may be considered to improve the structural and/or software aspects of the mobile terminal.

In recent years, the size of a display unit for displaying a screen has been taken into consideration as one of the improvements in the structure of a terminal. However, the size of the display unit may be limited by an electronic element, for example, a front camera, and the like, for implementing a function of the terminal through a front surface of the terminal. Accordingly, a method for further expanding a portion of displaying the screen by exceeding the limit through a structural change of the display unit may be taken into consideration.

SUMMARY OF THE INVENTION

One aspect of the present disclosure is to provide a mobile terminal capable of implementing a large screen.

Furthermore, another aspect of the present disclosure is to provide a mobile terminal in which a size of the display unit is further expanded while maintaining a function of the terminal implemented by a front surface thereof.

In order to accomplish the foregoing objective, a mobile terminal according to an embodiment of the present disclosure may include a mobile terminal a terminal body having a camera, and a liquid crystal panel partitioned into a screen display region disposed with liquid crystal to display a screen, and a control region disposed with a drive circuit for driving the liquid crystal, wherein the liquid crystal panel is formed such that at least part of the control region is removed, and the camera is disposed adjacent to a removal portion formed by the removal.

As an example associated with the present disclosure, the removal portion may be formed in the form of being cut at a corner thereof to prevent a damage that can be occurred at at least one of the corners of the control region.

The liquid crystal panel may be placed on a frame, and a groove recessed toward the liquid crystal panel may be formed on the frame to correspond to the removal portion. At least part of the camera may be accommodated into the groove. The frame may be formed of a synthetic resin material, and the groove may be recessed toward the liquid crystal panel on a side of the frame.

The liquid crystal panel may be placed on a frame, and an inclined portion intersected with both sides of the frame may be formed to correspond to the form of being cut at a corner of the frame.

As another example associated with the present disclosure, a driver integrated circuit may be mounted at a center of the control region, and the removal portion may be formed at at least one of the left and right corners with reference to the center.

The removal portion may be formed at either one of the left and right corners, and a test element group may be disposed at an opposite region to a region formed with the removal portion of the control region. A wiring of the gate-in-panel (GIP) gate driver may be disposed at a region formed with the removal portion of the control region.

As still another example associated with the present disclosure, the removal portion may be formed at either one of the left and right corners, and may include a first portion disposed adjacent to the camera, and a second portion formed at the other one of the left and right corners.

An electronic element different from the camera may be disposed at the second portion.

An antenna pattern for transmitting and receiving wireless signals may be formed adjacent to a corner of the body, and at least part of the antenna pattern may be disposed to correspond to the second portion.

As still another example associated with the present disclosure, a flexible circuit board may be connected to a center of the control region, and a driver integrated circuit may be mounted on the flexible circuit board to control a voltage applied to the screen display region. The removal portions may be formed at both corners of the control region, respectively, to be symmetrical around the center.

As still another example associated with the present disclosure, the camera may include a lens tube mounted with a lens, and a protrusion portion protruded in a radial direction of the camera with respect to the lens tube to be extended from the lens tube and overlapped with the liquid crystal panel in a thickness direction of the body.

The liquid crystal panel may be placed on a frame, and a groove recessed toward the liquid crystal panel may be formed on the frame to correspond to the removal portion, and at least part of the lens tube may be accommodated into the groove, and the protrusion portion may be formed to be overlapped with an edge of the groove in a thickness direction of the body.

As still another example associated with the present disclosure, the liquid crystal panel may have an upper substrate and a lower substrate, and the liquid crystal may be disposed between the upper substrate and the lower substrate, and the control region may be formed on the lower substrate, and the removal portion may be formed at least one of the corners of the lower substrate.

As still another example associated with the present disclosure, the liquid crystal panel may be a pentagon having the removal portion as a side thereof.

Furthermore, according to the present disclosure, there is disclosed a mobile terminal including a terminal body mounted with a window, and a display disposed to correspond to the window, wherein the display may include a screen display region formed to display a screen, and a control region disposed with a driver integrated circuit for controlling the screen display region, and partitioned into a first and a second region with reference to the driver integrated circuit, wherein a test element group is disposed in the first region, and the second region is formed in the form of being cut at a corner thereof to reduce an area occupied by the display in the body.

A wiring of the gate-in-panel (GIP) gate driver may be disposed in the second region. A camera formed toward the window may be disposed at a portion removed from the second region by the cutting. The display may be placed on a frame, and a groove disposed to correspond to the removed portion, and into which at least part of the camera is accommodated may be formed on the frame.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
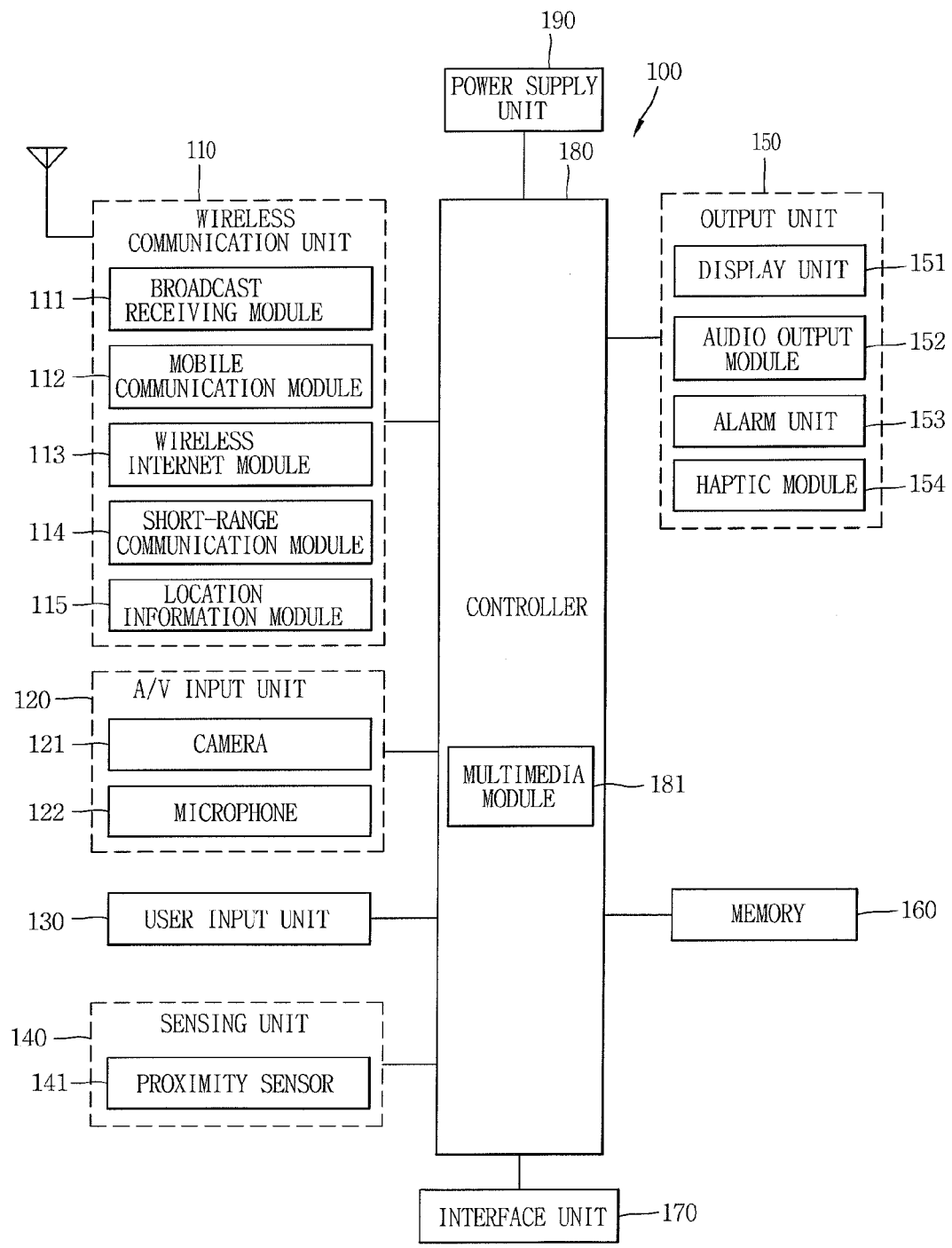
FIG. 1 is a block diagram illustrating a mobile terminal associated with an embodiment of the present invention.

Hereinafter, a mobile terminal associated with the present invention will be described in more detail with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

The suffixes "module" and "unit or portion" for components used in the following description merely provided only for facilitation of preparing this specification, and thus they are not granted a specific meaning or function.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal associated with an embodiment of the present invention.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the NV (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display(output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Figure 2A:
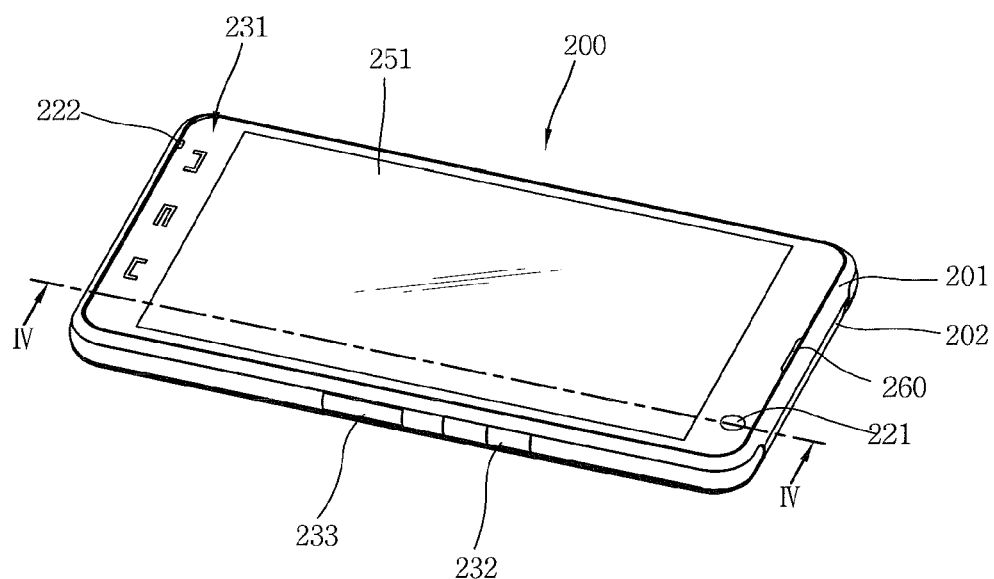
FIG. 2A is a front perspective view illustrating an example of the mobile terminal associated with the present invention.
Figure 2B:
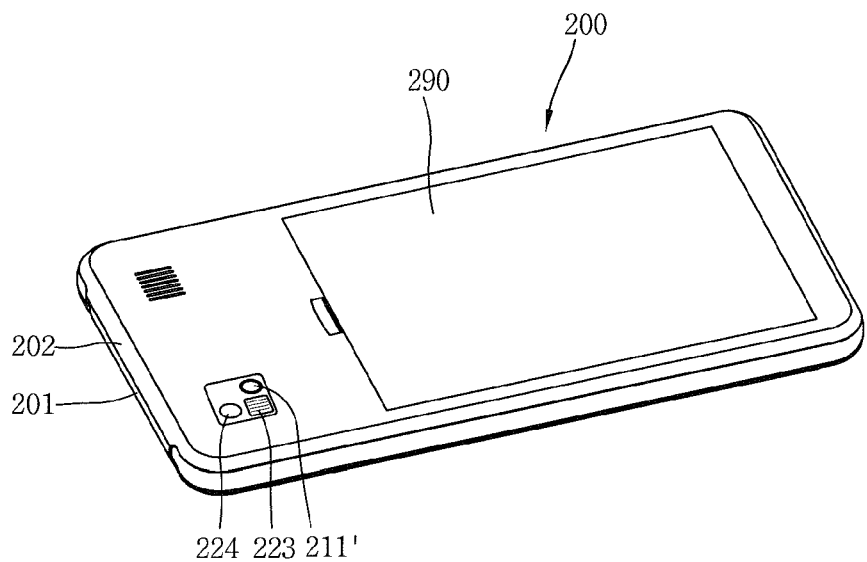
FIG. 2B is a rear perspective view illustrating a mobile terminal illustrated in FIG. 2A.

FIG. 2A is a front perspective view illustrating an example of a mobile terminal associated with the present invention, and FIG. 2B is a rear perspective view illustrating a mobile terminal illustrated in FIG. 2A.

The mobile terminal 200 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 201 and a rear case 202. Various electronic components may be incorporated in a space formed between the front case 201 and the rear case 202. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 251, an audio output module 260, a camera 221, a user input unit (231, 232, 233), and the like may be arranged on the terminal body, mainly on the front case 201.

The display unit 251 occupies a most portion of the front case 201. The audio output module 260 and the camera 221 are disposed on a region adjacent to one of both ends of the display unit 251.

Various kinds of visual information may be displayed on the display unit 251. The visual information may be displayed in a form of characters, numerals, symbols, graphics, or icons.

For an input of the visual information, at least one of the characters, numerals, symbols, graphics, or icons may be displayed with a predetermined arrangement so as to be implemented in a form of keypad. Such a keypad may be referred to as a so-called "soft key."

The display unit 251 may be operated as an overall region, or may be divided into a plurality of regions to be operated. In case of the latter, the plurality of regions may be configured to be operated in an associative manner with one another.

The user input unit 230 is manipulated to receive a command for controlling the operation of the mobile terminal 200, and may include a plurality of manipulation units 231, 232, 233. The manipulation units 231, 232, 233 may be commonly designated as a manipulating portion, and any method may be employed if it is a tactile manner allowing the user to perform manipulation with a tactile feeling.

The content inputted by the first through third manipulation units 231, 232, 233 may be set in various ways. For example, the first manipulation unit 231 may be used to receive a command, such as start, end, scroll, or the like, and may be disposed at a region adjacent to an end portion, which is different from the end portion disposed with the audio output module 260, at both end portions of the display unit 251.

The second and the third manipulation unit 232, 233 may be formed to receive a command, such as controlling a volume level being outputted from the audio output module 260, or switching into a touch recognition mode of the display unit 251.

Referring to the drawing, a wired/wireless headset port 271 and a wired/wireless data port 272 may be disposed at a lower surface of the mobile terminal. The ports 271, 272 may be configured as an example of the interface 170 (refer to FIG. 1).

Referring to FIG. 2B, a camera 221' may be additionally mounted on a rear surface of the terminal body, namely, the rear case 202. The camera 221' has an image capturing direction, which is substantially opposite to the direction of the camera 221 (refer to FIG. 2A), and may have different pixels from those of the first video input unit 221.

For example, it is preferable that the camera 221 has a relatively small number of pixels enough not to cause a difficulty when the user captures his or her own face and sends it to the other party during a video call or the like, and the camera 221' has a relatively large number of pixels since the user often captures a general object that is not sent immediately. The cameras 221, 221' may be provided in the terminal body in a rotatable and popupable manner.

Furthermore, a flash 223 and a mirror 224 may be additionally disposed adjacent to the camera 221'. The flash 223 illuminates light toward an object when capturing the object with the camera 221'. The mirror 224 allows the user to look at his or her own face, or the like, in a reflected way when capturing himself or herself (in a self-portrait mode) by using the camera 221'.

Furthermore, an audio output module may be additionally disposed on a rear surface of the terminal body. The audio output module together with the audio output module 260 (refer to FIG. 2A) can implement a stereo function, and it may be also used to implement a speaker phone mode during a phone call.

Furthermore, an antenna for receiving broadcast signals may be additionally disposed on a lateral surface of the terminal body. The antenna constituting a broadcast receiving module 111 (refer to FIG. 1) may be provided so as to be pulled out from the terminal body.

Referring to the drawing, a microphone 222, an interface 270, and the like may be provided on the terminal body. The microphone 222 may be disposed at a region adjacent to an end portion, which is different from the end portion disposed with the audio output module 260, on the display unit.

A user input unit 232 and a connection port 273 may be disposed at the lower surfaces of the front case 201 and rear case 202.

The connection port 273 is provided to receive data from an external device, and receive power and transfer it to each constituent element within the mobile terminal 200, and transfer data within the mobile terminal 200 to an external device. The connection port 273 may be configured as an example of the interface 170 (refer to FIG. 1).

Furthermore, a power supply unit 290 for supplying power to the mobile terminal 200 may be mounted on the terminal body. The power supply unit 290 may be configured so as to be incorporated in the terminal body, or directly detachable from the outside of the terminal body.

Referring to FIG. 2A again, a display unit 251 may be formed in a large screen. In other words, the display unit 251 may occupy most of a front surface of the terminal body. For this purpose, a bezel exposed to the front surface may be formed in a very narrow manner, thereby reducing a distance between the camera 221 and the display unit 251. The present invention discloses a mechanism for implementing the structural characteristic, and the mechanism will be described below.

Figure 3:
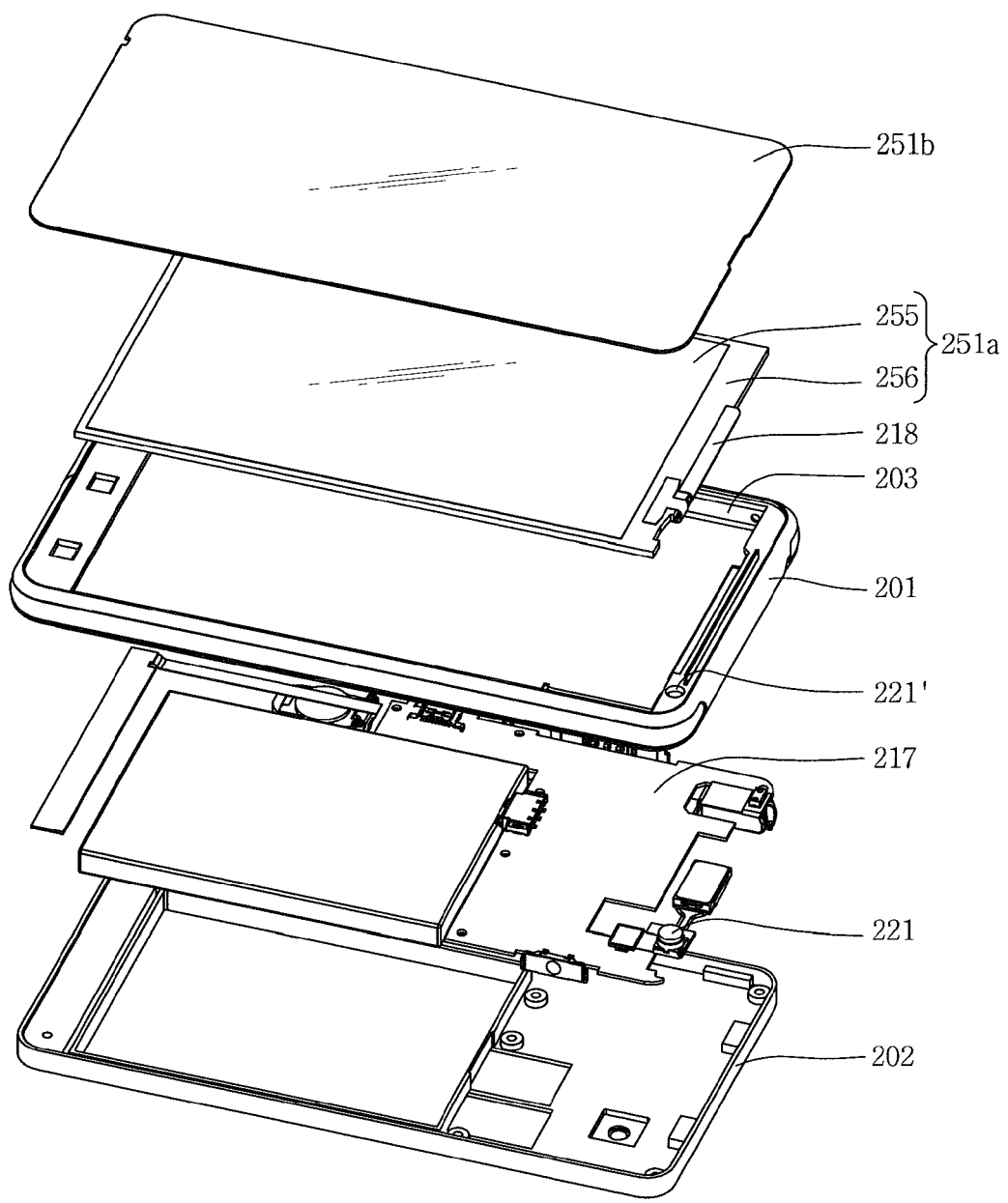
FIG. 3 is a front exploded view illustrating a mobile terminal in FIG. 2A.
Figure 4:
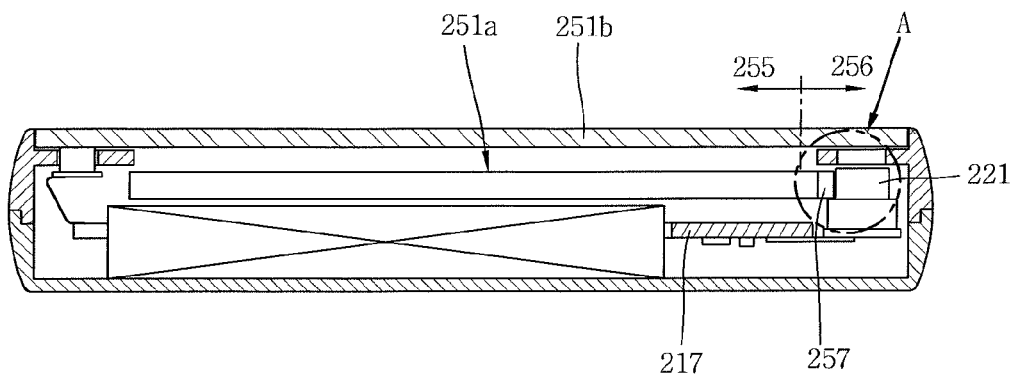
FIG. 4 is a cross-sectional view illustrating a cutting line of FIG. 2A viewed in a direction of the line IV-IV.

FIG. 3 is a front exploded view illustrating a mobile terminal in FIG. 2A, and FIG. 4 is a cross-sectional view illustrating a cutting line of FIG. 2A viewed in a direction of the line IV-IV.

Referring to FIG. 3, a window 251b is combined with a surface of the front case 201. A touch sensor (not shown) may be mounted on the window 251b. The touch sensor may be formed to detect a touch input, which is made of light transmission. The touch sensor may be mounted on a front surface of the window 251b, and may be configured to convert a change of voltage or the like generated on a specific portion of the window 251b into an electrical input signal.

According to the drawing, the window 251b is mounted on a bezel 203 of the front case 201. Contrary to this example, the bezel 203 may be separately provided from the front case 201.

The window 251b may be configured with an optically transmissive material, such as a light transmissive synthetic resin, a tempered glass, or the like. However, the window 251b may include an optically non-transmissive portion. The optically non-transmissive portion may be implemented by separately covering a pattern film over the window. The pattern film may be transparent at the center thereof, and non-transparent at the edge thereof.

A non-transparent portion of the pattern film may be formed to cover the bezel 203, and a transparent portion thereof may be formed to cover the display 251a. Through this, the user can recognize visual information displayed on the display 251a from the outside. According to the present invention, there is proposed a mechanism capable of obtaining the bezel 203 having the minimum width.

According to the drawing, the display 251a may be mounted on a rear surface of the window 251b and a circuit board 217 may be mounted on the rear case 202. The circuit board 217 may be configured as an example of the controller 180 (refer to FIG. 1) for performing various functions of the mobile terminal. As illustrated in the drawing, the camera 221 may be connected to the circuit board 217 to capture an external image from the front surface of the terminal, and a camera hole 221' may be formed on the bezel 203.

Referring to FIG. 3, the display 251a may be partitioned into a screen display region 255 and a control region 256.

The screen display region 255 is a region for displaying a screen, and the control region 256 may be a region in which circuit wirings are disposed to control the screen display region 255. The control region 256 of the display 251a may be referred to as a screen non-display region on which a screen is not displayed.

The screen display region 255 may be disposed within a region limited by the bezel 203. On the contrary, the control region 256 may be overlapped with the bezel 203 in a thickness direction of the terminal.

According to the drawing, a flexible circuit board 218 may be connected to the control region 256, and the flexible circuit board 218 may be connected to the circuit board 217 to supply power or transfer control commands to the display 251a.

According to the present embodiment, a thin-film transistor liquid crystal display (TFT LCD) is disclosed as an example of the display 251a, but the present invention will not be limited to this. For example, the display unit 251a may include a liquid crystal display (LCD), a thin film transistor-LCD (TFT-LCD), an organic light-emitting diode (OLED) display, a flexible display, a three-dimensional (3D) display, or the like.

Referring to FIG. 4, the display 251a may be formed such that a corner thereof is cut to reduce an area occupied by the display 251a in the terminal body. More specifically, at least part of the control region 256 of the display 251a may be removed. The camera 221 may be disposed at a removal portion 257 formed by the removal, and through this, the camera 221 and the display unit 251 (refer to FIG. 2A) may be formed more adjacent to each other.

Hereinafter, referring to FIGS. 5 through 8, a structure of the display 251a and the camera 221 will be described in more detail.

Figure 5:
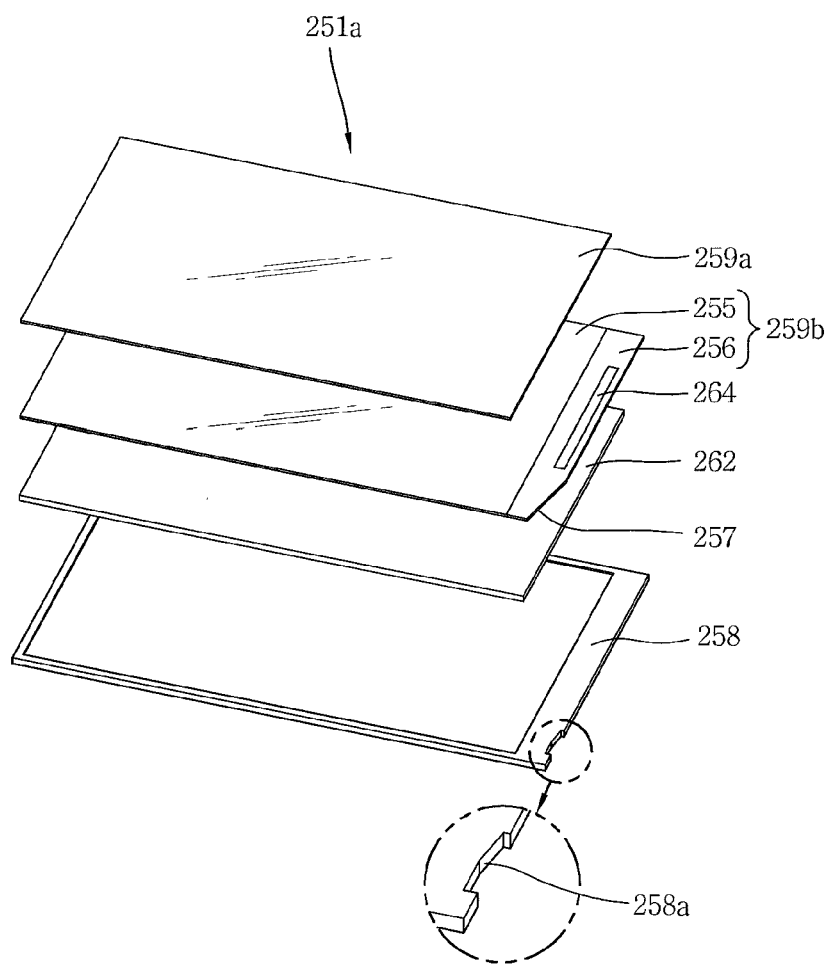
FIGS. 5 and 6 are enlarged views illustrating a display and a camera, respectively, in FIG. 3.
Figure 6:
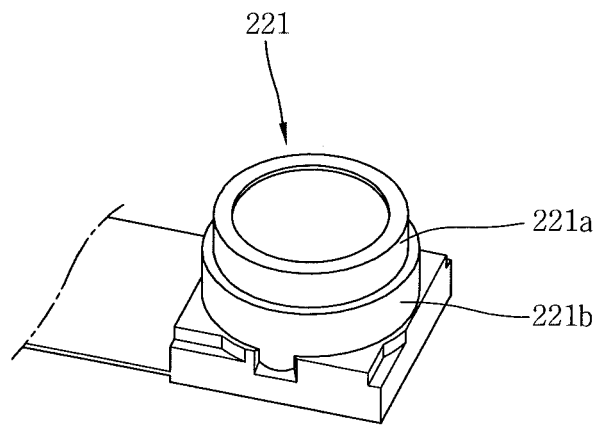
Figure 7:
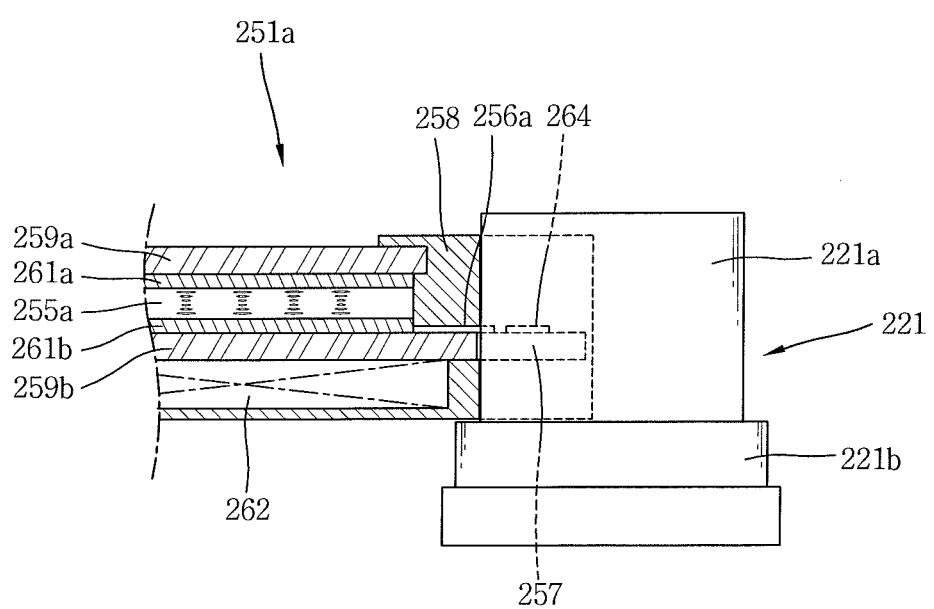
FIG. 7 is an enlarged view illustrating the portion of "A" in FIG. 4.
Figure 8:
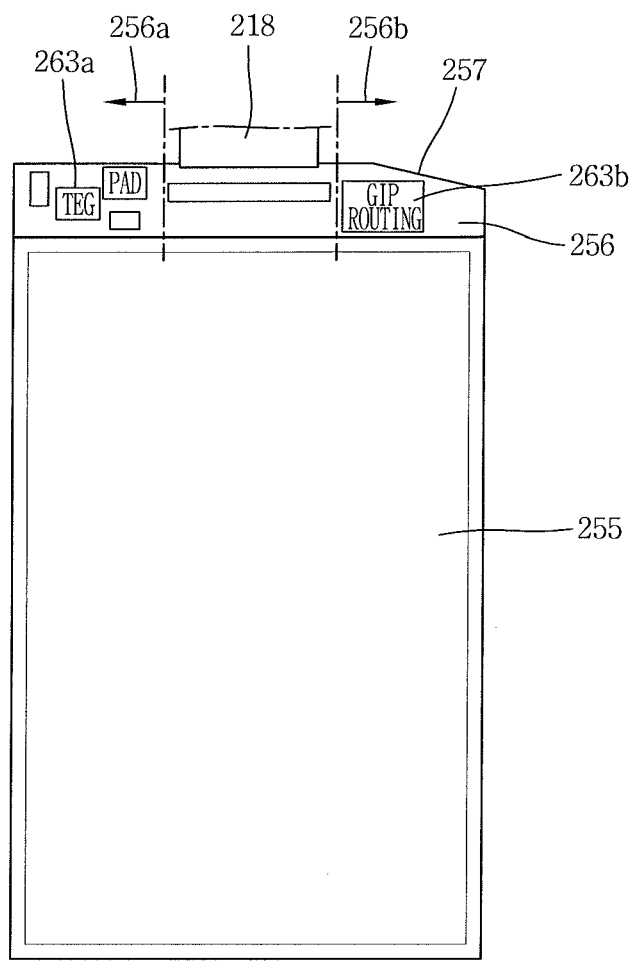
FIG. 8 is a conceptual view illustrating the circuit arrangement of a liquid crystal panel in FIG. 6.

FIGS. 5 and 6 are enlarged views illustrating a display and a camera, respectively, in FIG. 3, and FIG. 7 is an enlarged view illustrating the portion of "A" in FIG. 4, and FIG. 8 is a conceptual view illustrating the circuit arrangement of a liquid crystal panel in FIG. 6.

Referring to FIGS. 5 and 7, the display 251a is made of a liquid crystal panel accommodated into a frame 258. The liquid crystal panel may be implemented in such a structure that liquid crystal 255a is disposed in the screen display region 255 and a drive circuit 256a for driving the liquid crystal is disposed in the control region 256.

More specifically, the liquid crystal panel may be provided with an upper substrate 259a and a lower substrate 259b, and the liquid crystal 255a may be disposed between the upper substrate 259a and the lower substrate 259b, and the control region may be formed on the lower substrate 259b.

The upper substrate 259a and lower substrate 259b are glass substrates, in which the upper substrate 259a may be a color filter substrate (glass), and the lower substrate 259b may be a thin-film transistor (TFT) array substrate (glass). Furthermore, a polarizing film (not shown) may be mounted at an upper portion of the upper substrate 259a, and a back light unit (BLU) 262 may be disposed at a lower portion of the lower substrate 259b.

Electrode films 261a, 261b for applying a voltage to the liquid crystal 255a may be disposed at the upper substrate 259a and lower substrate 259b, respectively, and thin-film transistors (TFTs) disposed at the lower substrate 259b may be connected to the electrode films 261a, 261b to control the voltage.

The lower substrate 259b may be formed to be larger than the upper substrate 259a, and a portion of the lower substrate 259b, which is not covered by the upper substrate 259a, may form the control region 256. Wirings of the thin-film transistors may be formed in the control region 256, and a driver integrated circuit 264 may be mounted at the center of the control region 256.

According to the drawing, the removal portion 257 of the display 251a is formed at at least one of the corners of the lower substrate 259b. For example, the removal portion 257 may be formed at at least one of the left and right side corners with reference to the center of the control region 256 to remove at least part of the control region 256.

The liquid crystal panel has a horizontal and a vertical length, and the length of the removal portion 257 may be ½ to 1/10 of the horizontal length. According to the experiment, a space for moving the camera can be secured only when exceeding the minimum of 1/10.

More specifically, the removal portion 257 may be formed in the form of being cut at at least one corner of the control region 256. Here, cutting does not necessarily have the meaning of being limited to a processing method. For example, a portion removed from the lower substrate may be implemented through a method other than cutting, for example, a shape change of the frame for fabricating a substrate, or the like.

Cutting may be carried out to intersect both sides of the display 251a (namely, in a slant line). In other words, the liquid crystal panel may be formed with a pentagon having the removal portion 257 as a side thereof. Through this, it may be possible to prevent a damage that can be occurred at a corner of the display 251a.

Referring to FIGS. 6 and 7 together with FIG. 3, the camera 221 may be disposed adjacent to the removal portion 257. More specifically, the camera 221 may be disposed at a portion removed from the lower substrate 259b by cutting, and formed toward the window 251b.

The camera 221 refers to a camera having an image sensor, such as one using a complementary metal oxide semiconductor (CMOS), or a charge-coupled device (CCD) capable of converting light into charge to obtain an image, and it may be used for the use of producing a still or moving picture or capturing the user for video communication.

The camera 221 may include a lens tube 221a and a protrusion portion 221b. The lens tube 221a may be a portion mounted with a lens, and the protrusion portion 221b may be a portion mounted with a sensor substrate for sensing an image. According to the drawing, the protrusion portion 221b may be extended from the lens tube 221a, and protruded in a radial direction of the camera 221 with respect to the lens tube 221a to be overlapped with the liquid crystal panel in a thickness direction of the terminal body.

More specifically, at least part of the camera 221 may be accommodated into a groove 258a of the frame 258. The frame 258 may be formed of a synthetic resin material, and may be a structure on which a liquid crystal panel is placed.

The groove 258a may be formed to be recessed toward the liquid crystal panel at a side of the frame 258 to correspond to the removal portion 257. For example, at least part of the lens tube 221a may be accommodated into the groove 258a, and the protrusion portion 221b may be overlapped with an edge of the groove 258a in a thickness direction of the terminal body.

According to the above-mentioned structure, an area occupied by the camera 221 and an area occupied by the display 251a may be overlapped with each other, thereby further reducing a width of the bezel 203 (refer to FIG. 3).

Referring to FIG. 8, the removal portion 257 may be formed at either one of the left and right corners of the control region 256, and the control region 256 may be partitioned into a first and a second region 256a, 256b with reference to the driver integrated circuit 264. According to the drawing, the first region 256a may be an opposite region to a region formed with the removal portion 257 of the control region, and a test element group 263a may be disposed in the first region 256a. Furthermore, a pad for electrically connecting to an intermediate layer of the display, or the like may be disposed in the first region 256a.

On the contrary, the second region 256b may be a region in which a corner thereof is cut to reduce an area occupied by the display 251a. In other words, the second region 256b may be a region in which the removal portion 257 of the control region 256 is formed, and a wiring 263b of the gate-in-panel (GIP) gate driver may be disposed in the second region 256b.

Generally, a wiring of the test element group and GIP gate driver may be configured together at a side with reference to the driver integrated circuit 264, but the area of the second region 256b can be reduced as the test element group is disposed in the first region 256a. In other words, an area occupied by the liquid crystal panel can be reduced while maintaining the performance of the liquid crystal panel.

Figure 9:
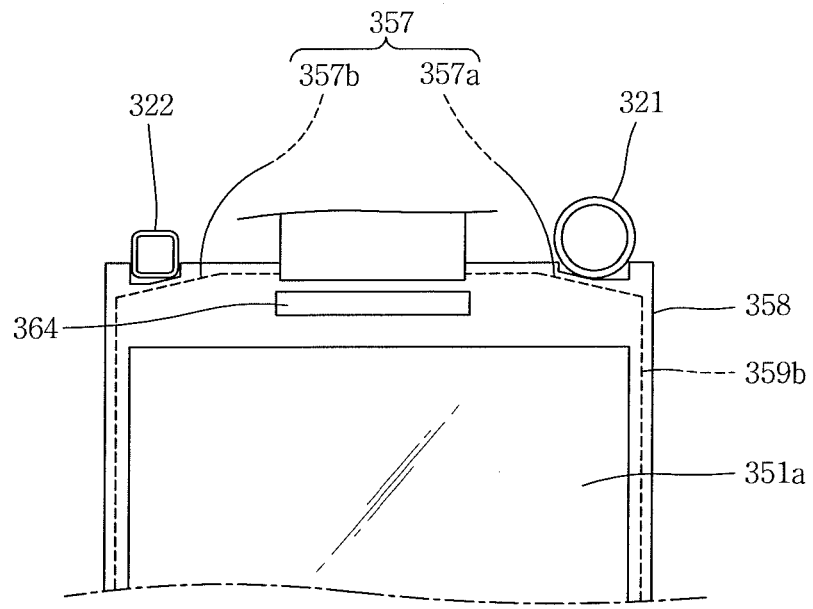
FIGS. 9 through 11 are conceptual views illustrating modified examples of a liquid crystal panel associated with the present invention.
Figure 10:
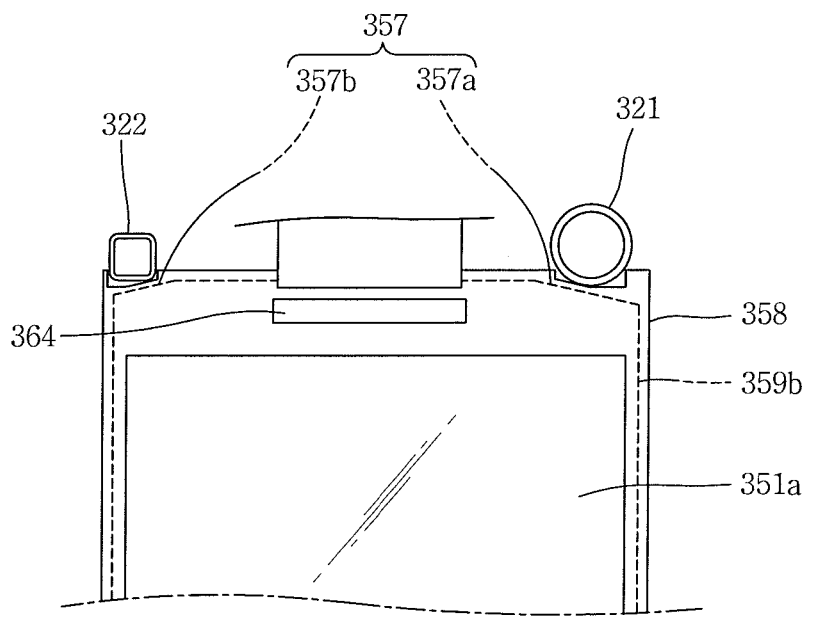
Figure 11:
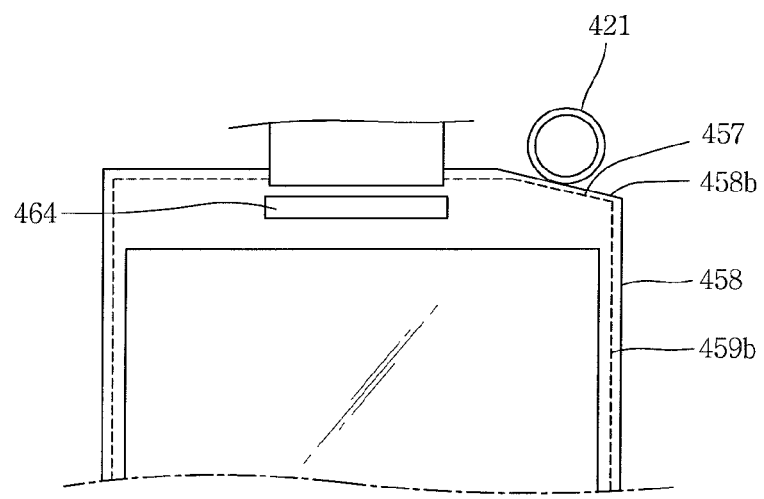
Figure 12:
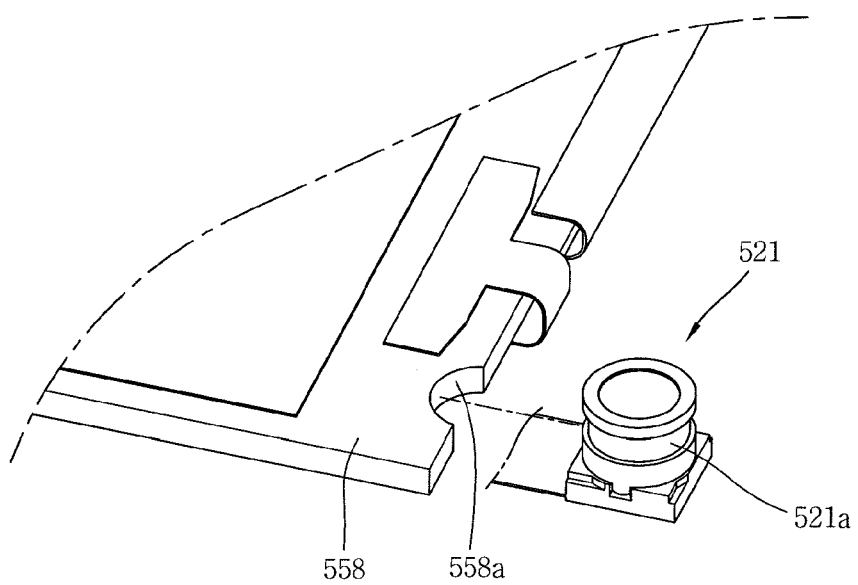
FIG. 12 is a conceptual view illustrating a modified example of a camera associated with the present invention.

FIGS. 9 through 11 are conceptual views illustrating modified examples of a liquid crystal panel associated with the present invention, and FIG. 12 is a conceptual view illustrating a modified example of a camera associated with the present invention.

Referring to FIG. 9, a lower substrate 359b of the display 351a may be formed such that both corners thereof are cut, respectively, around the driver integrated circuit 364. More specifically, the removal portion 357 of the display window 351a may include a first portion 357a formed on either one of the left and right corners of the control region and a second portion 357b formed on the other one. Furthermore, the frame 358 may be formed with a plurality of grooves corresponding to the first and second portions 357a, 357b. Here, the first portion 357a may be a portion disposed adjacent to the camera 321.

The second portion 357b may be disposed with an electronic element 322 different from the camera 321. As an example of the different electronic element, a proximity sensor, an ambient light sensor, and the like may be disposed adjacent to the second portion 357b. Through this, the proximity sensor, ambient light sensor, and the like may be more adjacent to the display 351a while maintaining sensing the proximity of an object and sensing the illumination, and the like, thereby implementing the terminal having a narrow bezel width.

Furthermore, as an example of the different electronic element, a metal connector (for example, a USB connector, a VGA slot, an external I/O port, etc.) may be disposed at the second portion 357b. The metal connector may be formed toward a lateral surface of the terminal, and according to the structure, it may be possible to implement the terminal having a display unit with a large screen while a metal connector is disposed at a lateral surface of the terminal, particularly, adjacent to a corner thereof.

FIG. 10 illustrates a modified example of the display 351a in FIG. 9, wherein the first portion 357a and second portion 357b are formed to be non-symmetrical to each other. In other words, the left and right areas of the portions removed from a rectangular lower substrate 359b are non-symmetrical to each other, and elements with different volumes are disposed in the first and the second region, respectively, thereby reducing a width of the bezel as well as increasing an area of the lower substrate.

Referring to FIG. 11, the frame 458 may be formed in a similar shape to the removal portion 457 of the lower substrate 459b. For example, an inclined portion 458b intersected with both sides of the frame 458 may be formed to correspond to the form of being cut at a corner of the frame 458. To implement the present embodiment, a corner of the back light unit (not shown) may be removed in a similar shape to the removal portion 457 of the lower substrate 459b.

If the camera 421 is moved toward a lateral surface of the terminal in the structure illustrated in FIG. 3, then the display 451a will be further approached toward an end portion of the terminal. Through this, a screen of the display unit can be implemented with a larger size.

Referring to FIG. 12, a lens tube 521a of the camera 521 may be fitted into a groove 558a of the frame 558. In other words, an outer circumferential surface of the lens tube 521a may be formed in a shape corresponding to an inner circumferential surface of the groove 558a. Through this, the assembly process of the camera can be more simplified, thereby reducing the fabrication cost.

Moreover, a circumferential protrusion (not shown) fitted into the groove 558a of the frame 558 may be formed on the lens tube 521a of the camera 521. As the circumferential protrusion (not shown) is fitted into the groove 558a, it may be possible to modularize the camera 521 and display 551a.

Figure 13:
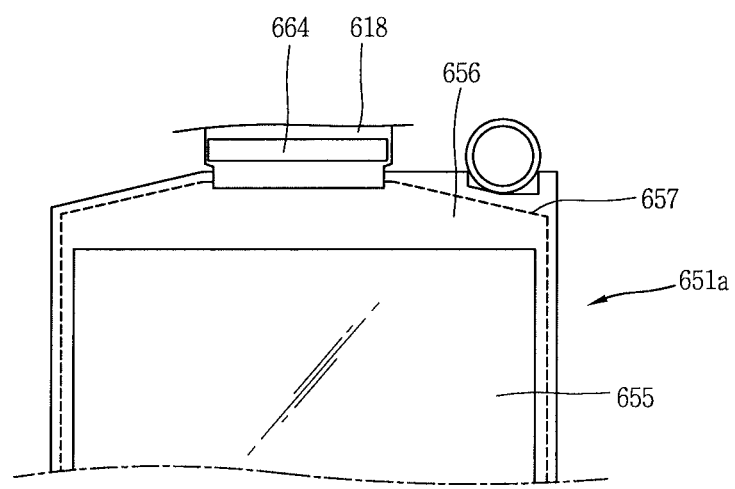
FIG. 13 is an exploded view illustrating a mobile terminal associated with another embodiment of the present invention.

FIG. 13 is an exploded view illustrating a mobile terminal associated with another embodiment of the present invention.

According to the drawing, a circuit board 618 is connected to a center of the control region 656 of the display 651a, and a driver integrated circuit 664 for controlling a voltage applied to a screen display region 655 is mounted on the flexible circuit board 618.

Furthermore, the removal portions of the display 651a may be formed at both corners of the control region 656, respectively, to be symmetrical around the center thereof. As the driver integrated circuit 664 is mounted on the flexible circuit board 618, an area of the control region 656 can be further reduced, and therefore, a required area of the control region 656 can be sufficiently secured even when the removal portions are formed at both corners of the control region 656, respectively.

According to the structure, a size of the control region 656 can be reduced while maintaining a size of the screen display region 655, thereby implementing the display unit with a larger screen.

Figure 14:
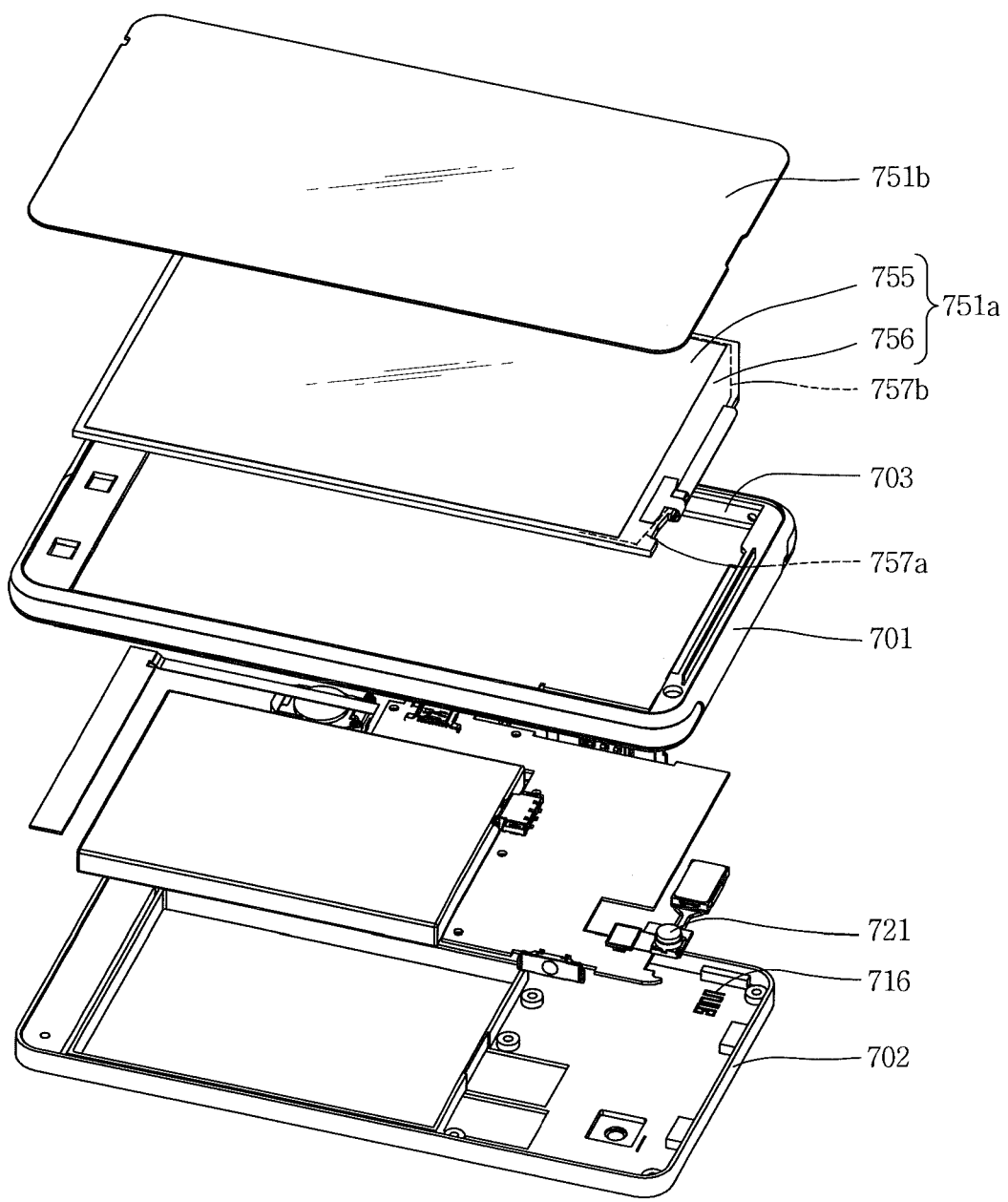
FIG. 14 is an exploded view illustrating a mobile terminal associated with still another embodiment of the present invention.

FIG. 14 is an exploded view illustrating a mobile terminal associated with still another embodiment of the present invention.

According to the drawing, an antenna pattern 716 for transmitting and receiving wireless signals may be formed adjacent to a corner of the terminal body. For example, the antenna pattern 716 may be formed at an inner surface of the rear case 702, and located at an opposite side to a corner adjacent to the camera 721.

The antenna pattern 716 may be formed by plating an inner surface of the rear case 702 or the like. However, the present invention will not be limited to this, and the antenna pattern 716 may be a metal decoration member outside the case, or may be provided as a separate antenna module (for example, a chip antenna, an antenna mounted on FPCB, or a carrier type antenna) inside the terminal.

Referring to FIG. 14, at least part of the antenna pattern 716 may be disposed to correspond to a second portion 757b of the removal portions of the control region 756. More specifically, the antenna pattern 716 may be overlapped with the second portion 757b in a thickness direction of the terminal. Furthermore, any electronic element may be not disposed around the second portion 757b, and a circuit board 717 may be formed not to block between the second portion 757b and the antenna pattern 716. The structure may be implemented by the shape in which a corner of the circuit board illustrated in FIG. 3 is removed.

The antenna pattern 716 may be formed to transmit and receive wireless signals having frequencies, for example, corresponding to Bluetooth communication, GPS communication, data communication, and the like.

The wireless signals radiated from the antenna pattern 716 may be mainly propagated to a lateral surface or rear surface of the terminal, but if it has a structure in which there is no conductor on a path through which wireless signals are propagated toward the front surface, then the wireless signals may be radiated toward the front surface of the terminal. Through this, the transmission and reception performance of the antenna pattern 716 can be enhanced.

According to a mobile terminal associated with at least one embodiment of the present invention having the foregoing configuration, part of the liquid crystal panel may be removed, and a camera may be disposed at the removal portion, thereby allowing the liquid crystal panel to be disposed more adjacent to an end portion of the terminal body. Furthermore, through this, a display unit with a larger screen can be implemented.

Furthermore, according to the present invention, a groove may be formed at a frame of the liquid crystal panel, thereby allowing the camera and the frame to be disposed in an overlapped manner. Through this, a bezel portion of the window can be formed in a narrower manner.

In addition, according to the present invention, a corner of the liquid crystal panel may be cut, thereby further increasing the strength of the liquid crystal panel against an external shock. Moreover, a test element group may be disposed at an opposite side to the cut portion, thereby reducing an area occupied by the liquid crystal panel as well as maintaining the performance of the liquid crystal panel.

The configurations according to the above-described embodiments will not be applicable in a limited way to the foregoing mobile terminal, and all or part of each embodiment may be selectively combined and configured to make various modifications thereto.

What is claimed is:

1. A mobile terminal, comprising:
a terminal body;
a liquid crystal panel partitioned into a screen display region disposed with liquid crystal to display information, and a control region disposed with a drive circuit for driving the liquid crystal; and
a camera located between the liquid crystal panel and an end of the terminal body,
wherein at least part of the liquid crystal panel is removed in the control region, and the camera is disposed adjacent to a removal portion formed by the removal, and
wherein the liquid crystal panel is placed on a frame, a groove recessed toward the liquid crystal panel is formed on the frame to correspond to the removal portion, and at least part of the camera is accommodated in the groove so as to prevent interference with said at least part of the liquid crystal panel.

2. The mobile terminal of claim 1, wherein the removal portion is formed in the form of being cut at a corner thereof to prevent damage that can occur at at least one of the corners of the control region.

3. The mobile terminal of claim 1, wherein the frame is formed of a synthetic resin material, and the groove is recessed toward the liquid crystal panel on a side of the frame.

4. The mobile terminal of claim 2,
wherein the frame includes an inclined portion intersecting both sides of the frame at a corner of the frame.

5. The mobile terminal of claim 1, wherein a driver integrated circuit is mounted at a center of the control region, and the removal portion is formed at at least one of the left and right corners with reference to the center.

6. The mobile terminal of claim 5, wherein the removal portion is formed at either one of the left and right corners, and a test element group is disposed at an opposite region to a region formed with the removal portion of the control region.

7. The mobile terminal of claim 6, wherein a wiring of a gate-in-panel (GIP) gate driver is disposed at the region formed with the removal portion of the control region.

8. The mobile terminal of claim 5, wherein the removal portion is formed at the left and right corners, and comprises:
a first portion disposed adjacent to the camera; and
a second portion formed at the other one of the left and right corners.

9. The mobile terminal of claim 8, wherein an electronic element different from the camera is disposed at the second portion.

10. The mobile terminal of claim 8, wherein an antenna pattern for transmitting and receiving wireless signals is formed adjacent to a corner of the body, and at least part of the antenna pattern is disposed to correspond to the second portion.

11. The mobile terminal of claim 1, wherein a flexible circuit board is connected to a center of the control region, and
a driver integrated circuit is mounted on the flexible circuit board to control a voltage applied to the screen display region.

12. The mobile terminal of claim 11, wherein the removal portions are formed at both corners of the control region, respectively, to be symmetrical around the center.

13. The mobile terminal of claim 1, wherein the camera comprises:
   a lens tube mounted with a lens; and
   a protrusion portion protruded in a radial direction of the camera with respect to the lens tube to be extended from the lens tube and overlapped with the liquid crystal panel in a thickness direction of the body.

14. The mobile terminal of claim 13, wherein the liquid crystal panel is placed on a frame, and a groove recessed toward the liquid crystal panel is formed on the frame to correspond to the removal portion, and
   at least part of the lens tube is accommodated into the groove, and the protrusion portion is formed to be overlapped with an edge of the groove in a thickness direction of the body.

15. The mobile terminal of claim 1, wherein the liquid crystal panel has an upper substrate and a lower substrate, and
   the liquid crystal is disposed between the upper substrate and the lower substrate, and the control region is formed on the lower substrate, and
   the removal portion is formed at at least one of the corners of the lower substrate.

16. The mobile terminal of claim 1, wherein the liquid crystal panel is a pentagon having the removal portion as a side thereof.

* * * * *